United States Patent
Diez et al.

(10) Patent No.: US 7,066,629 B2
(45) Date of Patent: Jun. 27, 2006

(54) INTERIOR LIGHT ASSEMBLY FOR VEHICLES, ESPECIALLY FOR MOTOR VEHICLES

(75) Inventors: Werner Diez, Wolfschlugen (DE); Stephan Ulloa, Wolfschlugen (DE)

(73) Assignee: Schefenacker Vision Systems Germany GmbH & Co. KG, Esslingen (DE)

( * ) Notice: Subject to any disclaimer, the term of this patent is extended or adjusted under 35 U.S.C. 154(b) by 108 days.

(21) Appl. No.: 10/065,477

(22) Filed: Oct. 22, 2002

(65) Prior Publication Data

US 2003/0076687 A1    Apr. 24, 2003

(30) Foreign Application Priority Data

Oct. 22, 2001 (DE) .......................... 201 17 292 U

(51) Int. Cl.
*B60Q 3/00* (2006.01)
*B60Q 3/02* (2006.01)

(52) U.S. Cl. .................... 362/488; 362/84; 362/544

(58) Field of Classification Search ............... 362/487, 362/369, 390, 84, 135, 540–545, 228, 244, 362/464, 471, 488; 340/479, 475, 471, 815.76; 296/76

See application file for complete search history.

(56) References Cited

U.S. PATENT DOCUMENTS

| | | | | |
|---|---|---|---|---|
| 2,552,389 A | * | 5/1951 | Arenberg et al. | 362/240 |
| 5,357,408 A | * | 10/1994 | Lecznar et al. | 362/490 |
| 6,280,480 B1 | * | 8/2001 | Tuttle et al. | 362/518 |
| 6,286,983 B1 | * | 9/2001 | Macher et al. | 362/487 |
| 6,412,973 B1 | * | 7/2002 | Bos et al. | 362/494 |
| 6,464,381 B1 | * | 10/2002 | Anderson et al. | 362/488 |
| 6,501,387 B1 | * | 12/2002 | Skiver et al. | 340/815.4 |
| 6,536,928 B1 | * | 3/2003 | Hein et al. | 362/464 |
| 6,783,167 B1 | * | 8/2004 | Bingle et al. | 296/76 |

* cited by examiner

*Primary Examiner*—Ali Alavi
*Assistant Examiner*—Bao Q. Truong
(74) *Attorney, Agent, or Firm*—Warn, Hoffmann, Miller & LaLone, P.C.

(57) ABSTRACT

An interior light assembly for motor vehicles has a frame and at least one lens arranged in the frame. At least one illumination element is arranged behind the at least one lens in the interior of the light assembly, and at least one electroluminescent film is additionally arranged behind the at least one lens n the interior of the light assembly. The electroluminescent film rests against a backside of the at least one lens, wherein the electroluminescent film has a contour identical to the contour of the at least one lens. The frame surrounds the at least one lens.

9 Claims, 4 Drawing Sheets

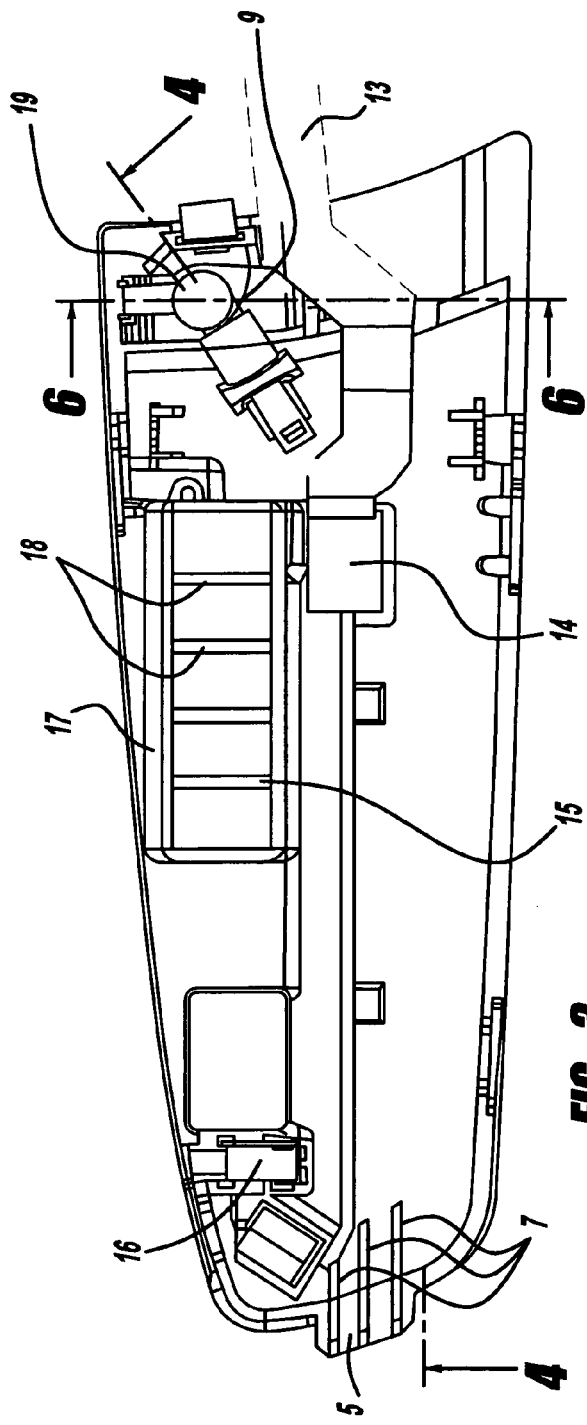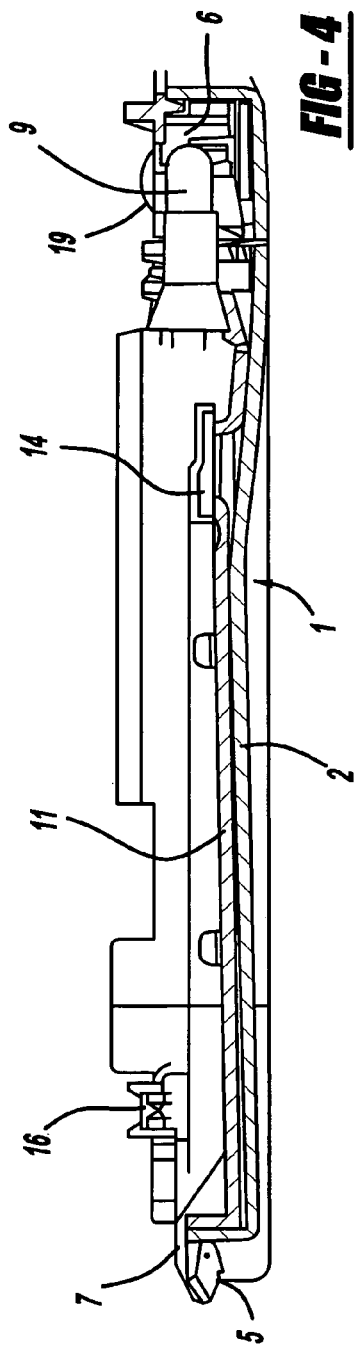

INTERIOR LIGHT ASSEMBLY FOR VEHICLES, ESPECIALLY FOR MOTOR VEHICLES

BACKGROUND OF THE INVENTION

1. Field of the Invention

The invention relates to an interior light assembly for vehicles, especially for motor vehicles, comprising at least one lens behind which at least one illumination element is located.

2. Description of the Related Art

Interior light assemblies for motor vehicles are known which are, for example, provided on the roof lining as reading lights in the area above the front seats and/or backseats. The illumination element is an incandescent light bulb which radiates light through the lens to such an extent that, for example, the front seat passenger can read a road map. As a result of the intensive light radiation, the interior light assembly can be switched on only for reading because it disturbs the driver while driving.

SUMMARY OF INVENTION

It is an object of the present invention to configure the interior light assembly such that the interior of the motor vehicle is illuminated in an optimal fashion.

In accordance with the present invention, this is achieved in that the interior light assembly comprises, in addition to the illumination element, at least one electroluminescent film.

The interior light assembly according to the invention thus comprises an electroluminescent film in addition to the illumination element. The interior light assembly can thus be switched on so that the electroluminescent film illuminates the inferior without the switched-on interior light assembly disturbing the driver driving the vehicle. When more light is needed in order to read a road map, for example, the illumination element can be switched on additionally. It is also possible to switch the electroluminescent film and the illumination element on and off simultaneously. The electroluminescent film generates additional light so that the illumination element can radiate with less intensity. The interior light assembly is employed preferably within the interior of the vehicle, for example, in the area above the front seats and/or backseat of the vehicle. It is also possible to arrange the interior light assembly, for example, within the floor space of the front seat passenger, in the area above the side window of the motor vehicle or also in the trunk space or in the cargo space of the vehicle. When the interior light assembly is provided in the trunk space or cargo space of the vehicle, it is expedient when the interior light assembly is automatically switched on upon opening the trunk space or the cargo space.

BRIEF DESCRIPTION OF DRAWINGS

FIG. 3 is a plan view of the backside of the interior light assembly.

FIG. 4 is a section along the line IV—IV of FIG. 3.

DETAILED DESCRIPTION

Figure 1:
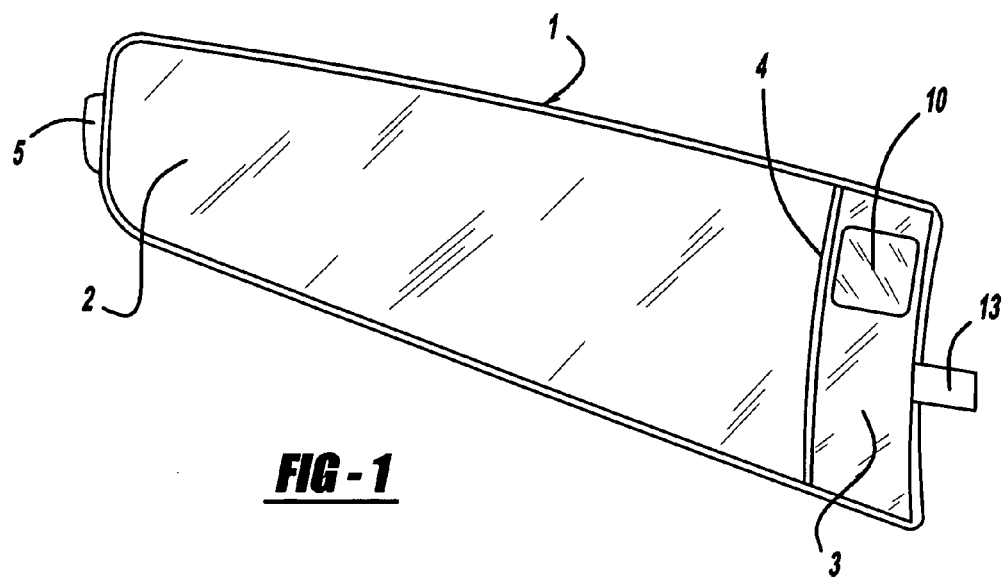
FIG. 1 is a perspective view of an interior light assembly according to the invention for a motor vehicle.

The interior light assembly in the illustrated embodiment is designed as a backseat light of a motor vehicle which is fastened, for example, on the roof lining of the motor vehicle. The interior light assembly comprises a support 1 which in the illustrated embodiment is a frame and has a substantially rectangular contour. The frame opening is closed by two lenses 2 and 3 which are advantageously made of plastic material. The lens 2 is substantially greater than the lens 3. Both lenses 2, 3 have a rectangular contour and are arranged such that their longitudinal axes are perpendicular to one another. The two lenses 2, 3 adjoin one another. The length of the smaller lens 3 corresponds to the width of the greater lens 2. In the illustrated embodiment, the two lenses 2, 3 are separated from one another by visible joint 4. However, it is also possible that the two lenses 2, 3 immediately abut one another.

In deviation from the illustrated embodiment, the frame-shaped support 1 can have any suitable contour. For example, the interior light assembly can have a round or elliptical contour, a square contour, or an irregular or asymmetrical contour shape, depending on the respective requirements and/or the mounting possibilities within the motor vehicle. Also, a visual division of the frame opening by two lenses 2, 3 is not required. The frame opening can also be filled completely by a single lens.

In the illustrated embodiment, the frame-shaped support 1 has substantially the same frame width about its circumference. The support 1 can also be of an areal configuration, for example, it can have one or several openings closed off by a lens, respectively, wherein the light passes through the lens(es) into the interior of the motor vehicle.

The interior light assembly can be fastened within the motor vehicle in any suitable way, for example, by snap-on connections, by means of screws and the like. In the illustrated embodiment, the support is provided with a projecting tongue 5 with which the interior light assembly engages behind the edge of a mounting opening provided within the motor vehicle. As illustrated particularly in FIG. 4, the frame-shaped support 1 has an edge 6 extending about its circumference that is angled at a right angle so that the support 1 is approximately tub-shape. The tongue 5 is provided at the free end of this edge 6 on a narrow side of the support 1, preferably as a unitary or monolithic part of the support 1. On the side of the tongue 5 facing away from the lenses 2, 3 the tongue 5 is provided with several parallel extending reinforcement ribs 7 which are advantageously a monolithic or unitary part of the tongue 5.

Figure 6:
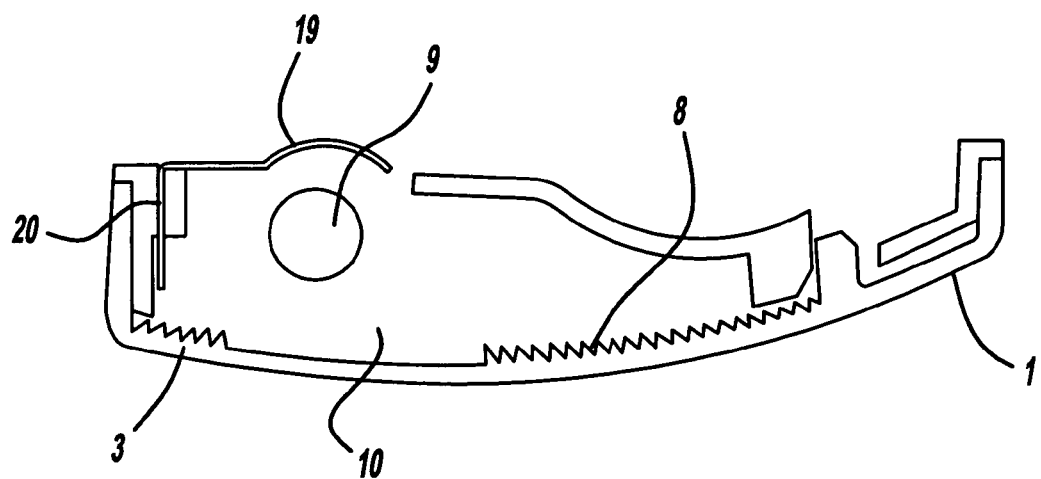
FIG. 6 shows in a schematic illustration a section along the line VI—VI of FIG. 3.

The support 1 is comprised advantageously of plastic material but can also be manufactured of metal. The lens 2 can have at its backside a corrugated or serrated appearance (corrugations or serrations). As illustrated in FIG. 6, the smaller lens 3 is also provided at its backside with corrugations or serrations 8. In an area directly in front of the illumination element 9 the lens 3 has an area 10 which is free of corrugations or serrations. The lens area 10, as illustrated in FIG. 1, can have a rectangular, in particular, square contour. Of course, the lens 10 can also have any other suitable and expedient contour. Depending on the position of the illumination element 9, the lens area 10 is arranged within the lens 3. In the illustrated embodiment, the lens area 10 is near one of the longitudinal sides of the interior light assembly.

An electroluminescent film 11, 12 rests against (is applied to) the backside of the lens 2 and/or of the lens 3. It covers advantageously the lenses 2, 3 completely. This electroluminescent film 11, 12 can be attached in any suitable way to the backside of the lens 2, 3. The light emitted by it penetrates the lenses 2, 3 and reaches the exterior of the interior light assembly, i.e., it illuminates the vehicle interior. Within the lens area 10 the electroluminescent film 12, if it is provided in this area, is cut out so that the light emitted by the illumination element 9 can pass through the lens area 10 to the exterior of the interior light assembly. The electrical supply of the electroluminescent film 11, 12 is realized in the form of a flat strip conductor 13 which is connected to an electronic unit 14. It is part of a converter 15 which, like the electronic unit 14, is provided on the backside of the interior light assembly. The electronic unit 14 is connected by electrical lines (not illustrated) to a plug receptacle (socket) 16 to which the electrical lines of the electroluminescent film 11 are connected. In the area of the electronic unit 14, the electroluminescent film 11 is advantageously interrupted. The converter 15 is positioned under a cover 17 which is provided with venting slots 18.

The voltage supply of the illuminating element 9 is also realized by means of an electronic unit 14 which is connected via electrical lines (not illustrated) to the illumination element 9. The illumination element 9 is an incandescent light bulb whose light penetrates the lens 3 and reaches the exterior of the interior light assembly. The incandescent light bulb 9 is positioned parallel to the lens 3 so that the interior light assembly has only minimal height. Instead of providing an light bulb, the illuminating element 9 can be provided in the form of at least one LED. The illuminating element 9 can serve as a reading light when the interior light assembly in the motor vehicle is arranged such that the light emitted by the illumination element 9 is emitted in the corresponding direction into the vehicle interior. In this case it is expedient when the entire lens 3 for the penetration of the light rays of the illumination element 9 is used. The electroluminescent film in this case is provided only in the area of the lens 2. Since the lens area 10 at the backside of the lens 3 has no optical elements, such as the serrations or corrugations 8, the light which passes through the lens area 10 has a high intensity so that the light is suitable excellently for reading within the vehicle.

Figure 2:
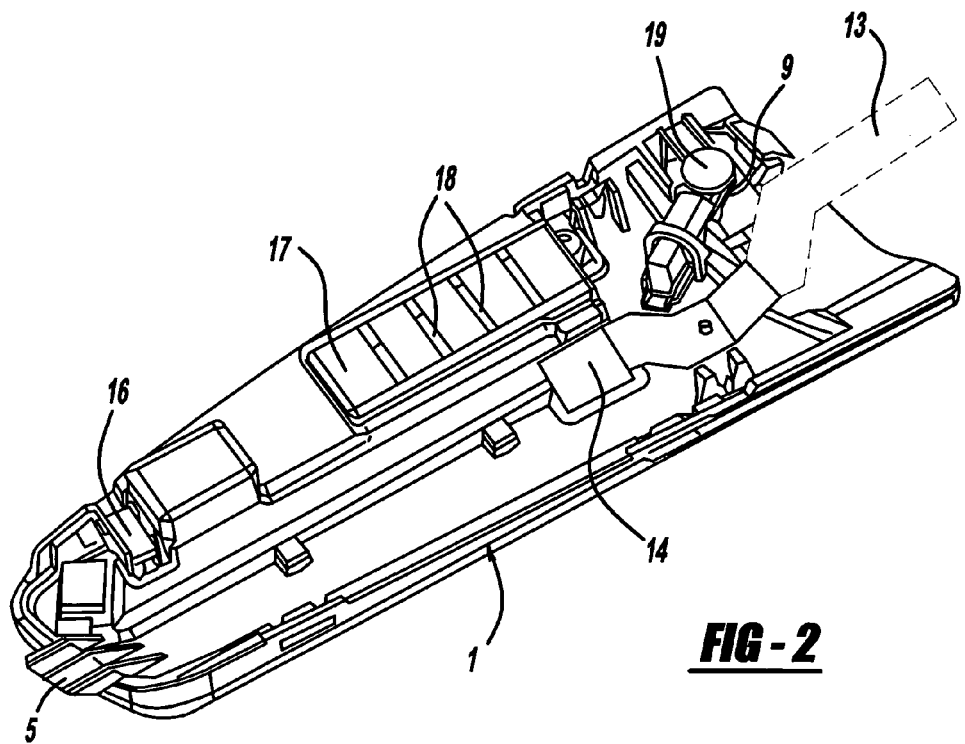
FIG. 2 is a perspective illustration of the backside of the interior light assembly according to FIG. 1.
Figure 5:
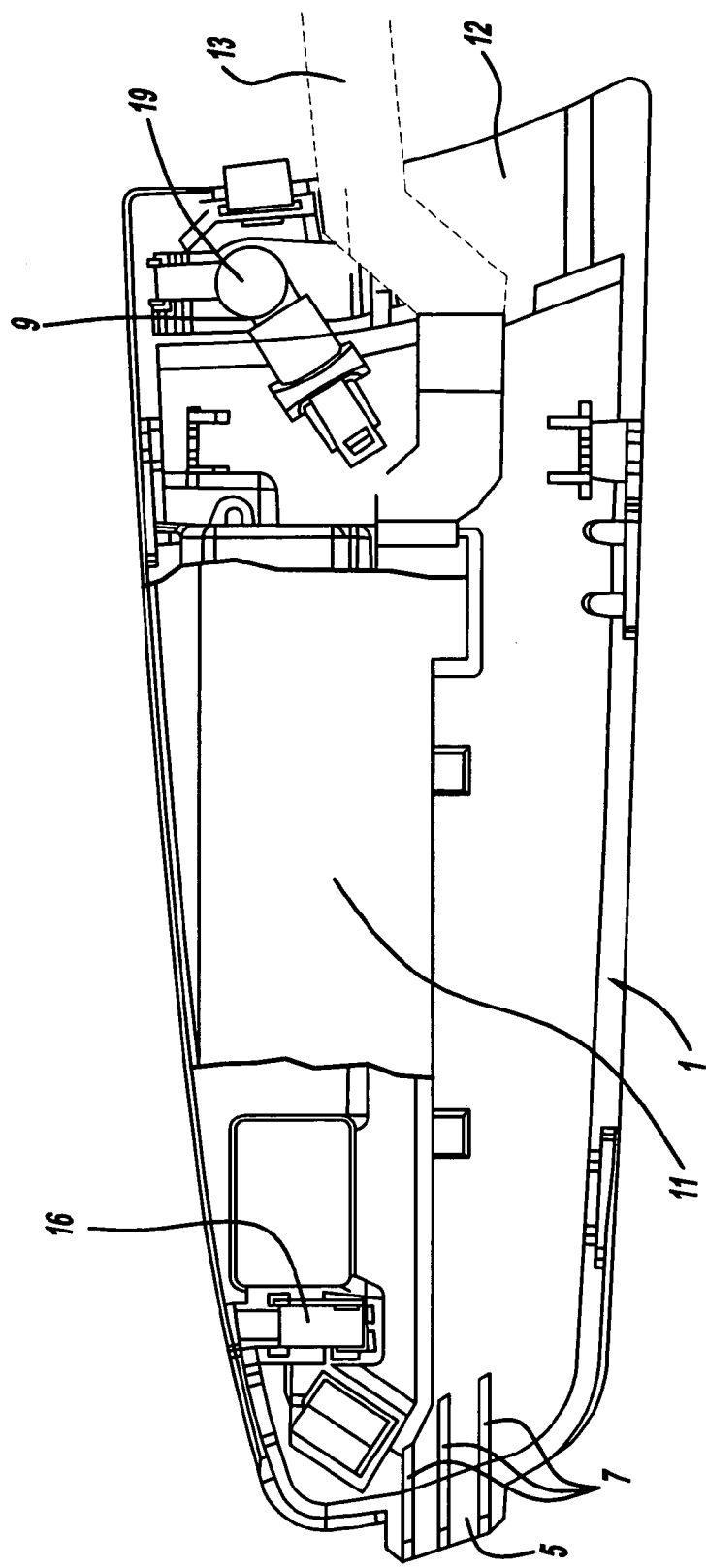
FIG. 5 is a plan view of the backside of the electroluminescent film within the interior light assembly.

In order for the rays emitted by the illumination element 9 to optimally reach the exterior of the interior light assembly, on the side of the illumination element 9 facing away from the lens 3 a reflector 19 is provided with which the rays emitted to the rear by the illumination element 9 are reflected on the reflector 19 forwardly onto the lens 3. The reflector in 19 is provided on an L-shaped holder 20 which is fastened on the inner side of the angled edge of the support 1 (FIG. 6). The components 14 through 16, required for the electrical supply of the illumination element 9 and the electroluminescent film 11, 12, are provided on the side of the electroluminescent film 11, 12 facing away from the lens 2, 3. As illustrated in the FIGS. 2, 3, and 5, these components are arranged substantially in the longitudinal direction of the interior light assembly sequentially behind one another so that the interior light assembly has only minimal width.

It is advantageous to switch the illumination element 9 and the electroluminescent film 11, 12 on and off independently from one another. The interior light assembly can be provided at any suitable location within the interior of the vehicle. It is also possible to attach the interior light assembly, for example, within the cargo space or trunk space or on the rear hatch or trunk lid.

While specific embodiments of the invention have been shown and described in detail to illustrate the inventive principles, it will be understood that the invention may be embodied otherwise without departing from such principles.

What is claimed is:

1. An interior light assembly for motor vehicles, the interior light assembly comprising:
    a frame having a frame opening and defining an interior of the interior light assembly;
    at least one lens connected to the frame and filling out the frame opening, wherein the at least one lens includes a first lens portion and a second lens portion; and
    at least one illumination element and at least one electroluminescent film arranged within the area of the frame opening behind the at least one lens in the interior of the interior light assembly so that light emitted by the at least one illumination element and the at least one electroluminescent film passes from the interior through the at least one lens arranged in the frame opening for illuminating a vehicle interior passenger compartment;
    wherein the light transmitted through the first lens portion is of a first intensity and the light transmitted through the second lens portion is of a second intensity, wherein the first intensity is greater than the second intensity.

2. The interior light assembly according to claim 1, wherein the at least one electroluminescent film is attached to a backside of the at least one lens facing the interior of the interior light assembly.

3. The interior light assembly according to claim 1, wherein the at least one electroluminescent film has a contour identical to a contour of the at least one lens.

4. The interior light assembly according to claim 1, wherein the frame surrounds the at least one lens.

5. The interior light assembly according to claim 1, wherein a first one of the at least one lens is correlated with the at least one illumination element and a second one of the at least one lens is correlated with the at least one electroluminescent film.

6. The interior light assembly according to claim 5, wherein the first lens for the at least one illumination element is smaller than the second lens for the at least one electroluminescent film.

7. The interior light assembly according to claim 5, wherein the first lens for the at least one illumination element has a backside facing the interior of the interior light assembly and provided at least partially with at least one optic.

8. The interior light assembly according to claim 7, wherein the at least one optic is comprised of serrations or corrugations.

9. The interior light assembly according to claim 1, wherein the at least one illumination element is an incandescent light bulb.

* * * * *